United States Patent [19]
Jones

[11] 3,893,337
[45] July 8, 1975

[54] ANGULAR DIRECTION RECORDERS

[75] Inventor: John Ivor Parry Jones, Winterslow, near Salisbury, England

[73] Assignee: British Secretary of State for Defence, London, England

[22] Filed: July 16, 1973

[21] Appl. No.: 379,663

[30] Foreign Application Priority Data
July 19, 1972 United Kingdom............... 33662/72

[52] U.S. Cl. .................................................. 73/188
[51] Int. Cl. ............................................ G01w 1/00
[58] Field of Search ............................... 73/188, 189

[56] References Cited
UNITED STATES PATENTS
| | | | |
|---|---|---|---|
| 3,059,343 | 10/1962 | Kermode | 73/496 |
| 3,387,491 | 6/1968 | Adams | 73/189 |
| 3,678,485 | 7/1972 | Jones | 73/188 |

FOREIGN PATENTS OR APPLICATIONS
| | | | |
|---|---|---|---|
| 487,299 | 6/1938 | United Kingdom | 33/319 |

OTHER PUBLICATIONS
Jones, J. I. P., *A New Recording Wind Vane*, In Journal of Physics E., Scientific Instruments., Vol. 3, p. 9–14, Jan. 1970, Q 184 J 7.

*Primary Examiner*—Richard C. Queisser
*Assistant Examiner*—Marcus S. Rasco
*Attorney, Agent, or Firm*—Elliott I. Pollock

[57] ABSTRACT

An angular direction sensing device having rotatably mounted on a support member a circular motion potentiometer having electrical power supply connections and input and output connections thereto and a plurality of tapping points, a magnet rotatably mounted so that it can align itself substantially freely with the earth's magnetic field, a rotor in accordance with the angular position of which the said tapping points are sequentially connectable to an output connection, and means whereby the angular position of the rotor in relation to a given tapping point of the potentiometer, and hence any electrical output signal thereof, is arranged to be a function of the angle between said given tapping point and the magnet and so independent of the orientation of said support member.

8 Claims, 1 Drawing Figure

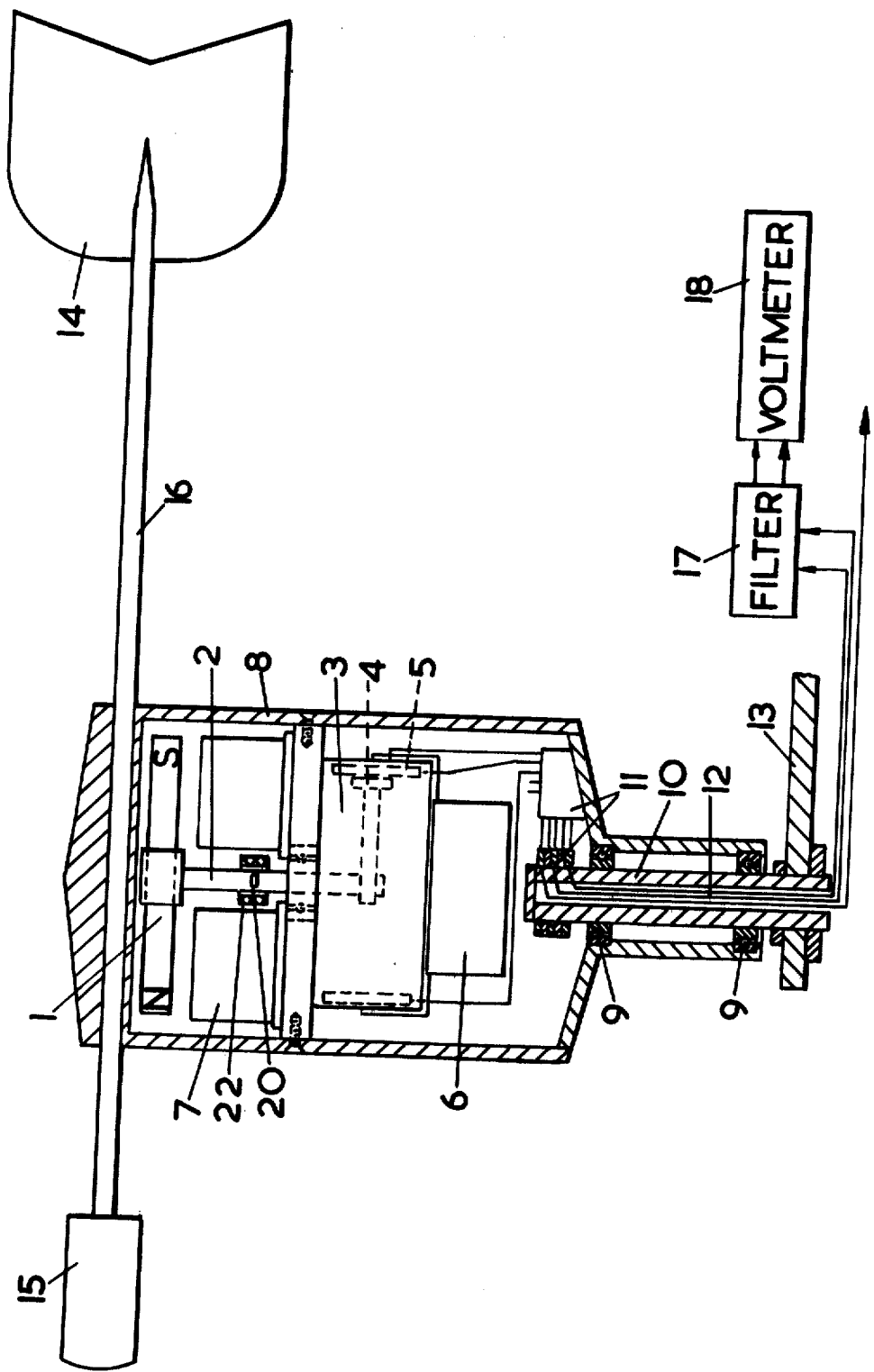

ANGULAR DIRECTION RECORDERS

This invention relates to angular direction sensing devices, more especially, but not exclusively, of the kind adapted to respond to the direction of an ambient fluid flow, as in a wind direction indicator.

Angular direction sensing devices for sensing angular direction or orientation require a fixed known bearing for reference. Where the support member, ie supporting base or platform, for the device is stationary and fixed in orientation such as for wind direction recording equipment on land, it is necessary only to align a fixed part of the device with some known bearing, eg north. Should, however, the support member be in a state of unpredictable motion, such as for a windvane mounted on a buoy at sea or for a suspended underwater current meter, it becomes necessary to either make separate measurement of the orientation of the support member relative to a fixed known bearing, or provide some power driven mechanism to stably maintain the orientation of said support or platform.

The present invention provides an angular direction sensing device which can produce an electrical output signal related to the angle between a chosen part of the device, which can respond directionally to an external stimulus, and a chosen direction, so that the signal is independent of the orientation of the support member on which the device is mounted.

According to the invention an angular direction sensing device has rotatably mounted on a support member a circular motion potentiometer having electrical power supply connections and input and output connections thereto and a plurality of tapping points, a magnet rotatably mounted so that it can align itself substantially freely with the earth's magnetic field, a rotor in accordance with the angular position of which the said tapping points are sequentially connectable to an output connection, and means whereby the angular position of the rotor in relation to a given tapping point of the potentiometer, and hence any electrical output signal therefrom, is arranged to be a function of the angle between said given tapping point and the magnet and independent of the orientation of said support or platform; the rotor desirably being rotatable with the magnet.

Optionally the device has a fin rotatably mounted so that it can align itself with an ambient fluid flow and means whereby the potentiometer tapping points and the rotor are rotated relative to one another in accordance with the angular position of said fin; desirably the device has an encasement which encloses the potentiometer; and optionally the fin encasement and potentiometer are rotatable together on a common mounting.

Preferably the connections to the potentiometer include slip-rings and coacting brushes intermediate the potentiometer and the support member.

Preferably the angular range of the device is arranged to be greater than 360° by the provision of a circular motion potentiometer having an element with dual supply positions, a two-state device which can apply a voltage to either one of said supply positions, a trigger device which actuates the two-stage device to change the voltage from one of said supply positions to the other at a predetermined relative angular position of the rotor and the given tapping point, and means for simultaneously bridging the position to which the voltage is not applied, as set forth in U.S. Pat. No. 3,678,485 and UK Patent Specification No. 1297111.

In applications where all natural relative angular variation between the rotor and potentiometer occur at lower frequencies than the natural frequencies of the device, the device may include means which can actuate an oscillatory angular movement between the rotor and the potentiometer tapping points.

It is to be understood that the plurality of tapping points referred to above includes the instance of a potentiometer in which resolution is virtually infinite, eg in the continuous track kind of potentiometer.

The invention will be further described, by way of example only, with reference to the drawing filed herewith, which is a sectional view of an angular direction sensing device constructed as a wind vane for measuring the direction of the wind.

The device has a magnet 1 attached to one end of the rotor shaft 2 of a low-friction rotary or circular motion potentiometer indicated generally by 3. The resistance element of the potentiometer is indicated by 5. The magnet 1 need not be mounted with the delicate jewel suspension usually incorporated in magnetic compasses. It is found adequate for the purposes of the present device if the shaft 2 carrying the magnet is mounted in robust precision ball races.

The lower end of the shaft 2 carries a voltage selecting device in the form of a rotor 4 which coacts with tapping points (not separately shown) of the resistance element 5 of potentiometer 3, so that when a supply voltage is applied to said element from a d.c. source an electrical output signal is produced at an output connection of the potentiometer such that said signal is a function of the angular position of the rotor 4 in relation to a given tapping point of the potentiometer. The angular range of the sensing device is arranged to be greater than 360° and the output voltage is arranged to be switched by an amount corresponding to 360° at range extremities such as to avoid any break in the angular coverage. The potentiometer element 5 is provided with dual supply positions, a two-state device 6 which can apply the d.c. voltage to either one of said supply positions, a trigger device which actuates the two-state device to change the voltage from one of the dual supply positions to the other or vice versa at a predetermined angular position of the rotor in relation to the given tapping point, and means for simultaneously bridging the position to which the voltage is not applied. Details of the above mentioned potentiometer arrangement are set forth in U.S. Pat. No. 3,678,485 and UK Patent Specification No 1297111, directly applicable to the present invention.

The above mentioned d.c. source may be contained within the angular direction sensing device in the form of batteries 7; or alternatively the source may be arranged externally with connection through leads.

The potentiometer 3 is attached to an encasement 8 for the rotatable parts of the device, the encasement being supported by bearings 9 on a tube 10. The upper part of the tube 10 also carried the rings of an assembly 11 of slip rings and coacting brushes in the electrical connections to the potentiometer. Thus the tube 10 carries the rotatable parts of the device, and the bore of the tube provides a passageway for the connecting wires 12 between the slip rings and the support member 13. A fin 14, with counterbalance weight 15 is attached to the encasement 8 of the instrument by means of shaft 16 so that the orientation of the instrument is controlled by the direction of the wind acting on the fin 14. The output voltage from the potentiometer, representing wind direction, is passed to a low-pass electrical filter 17 and thence to an indicating and/or recording d.c. voltmeter 18.

The manner of operation of the windvane is as follows. Wind incident on fin 14 aligns it with the direction of the wind, thereby causing the instrument encasement 8 and the attached potentiometer 3 to become correspondingly aligned. Except for the effects of friction at the bearings of the rotor shaft 2 and other restrictive torques, the orientation of the said shaft and its attached rotor 4 within the potentiometer remains substantially unchanged as magnet 1, also attached to the shaft, will always tend to lie in the direction of the earth's magnetic field. Frictional and torque restrictions to relative motion are reduced to negligible proportions in conditions of normal surface wind, where turbulence causes continual random angular to and fro motion of the fin and hence of the potentiometer; but in other applications, such as the measurement of the direction of flow in laminar conditions or of the orientation of a ship, aircraft or vehicle, where natural oscillation is minimal, it may be desirable to introduce oscillations artificially to improve accuracy.

Oscillations, for the reduction of "sticktion" efforts and increasing accuracy after time averaging as described below may be introduced, for example, by arranging small magnets, 20, in the shaft 2, surrounded by a coil system indicated diagrammatically by 22, the coil system being supplied with pulsating current e.g. from a vibrator (not shown) driven from the batteries 7. Alternatively the coil system 22 may be supplied with alternating current from an external source. Changes in wind direction cause corresponding changes in the relative positions of the rotor 4 within the potentiometer and the potentiometer element, thereby causing a change in output voltage related to wind direction. This voltage will, however, contain fluctuations in amplitude due to (a) the natural turbulent fluctuations of the wind, (b) a step function output voltage from the potentiometer where a potentiometer having a limited number of discrete output levels is employed, such as a potentiometer in which voltage is selected by means of reed switches and (c) a sinusoidal-like component caused by oscillation of the magnet system, due to magnetic drag in a reed switch type of potentiometer, or horizontal accelerations of the instrument where the magnet system is not dynamically balanced and the support member is in a state of irregular motion. Fluctuations in the output voltage would also be present due to oscillations introduced artificially, as described above, as a means of improving accuracy and reducing sticktion. Time averaging, or electrical low-pass filtering, by means of a filter circuit 17 having a time constant sufficiently long to exclude the lowest unwanted frequency of oscillation likely to be present in the signal, may then be employed to substantially remove the combined fluctuations in the output voltage and allow angular direction to be recorded to a high degree of accuracy.

I claim:

1. An angular direction sensing device having rotatably mounted on a support member a circular motion potentiometer having electrical power supply connections and input and output connections thereto and a plurality of tapping points, a magnet rotatably mounted so that it can align itself substantially freely with the earth's magnetic field, a rotor driven by rotation of the magnet and operable to connect said tapping points in accordance with its angular position to an output electrical connection, whereby the angular position of the rotor in relation to a given tapping point of the potentiometer, and hence any electrical output signal thereof, is proportional to the angle between said given tapping point and the magnet independent of the orientation of said support member, said device having a fin rotatably mounted so that it can align itself with an ambient fluid flow, and means for rotating the potentiometer tapping points with said fin so that the tapping points are rotated relative to the rotor in accordance with the angular position of said fin.

2. A device according to claim 1 having an encasement which encloses the potentiometer, magnet and rotor for protection thereof, the fin being mounted on the encasement.

3. A device according to claim 2 in which the fin, encasement and potentiometer are rotatable together on a common mounting.

4. A device according to claim 1 in which the electrical connections to the potentiometer include slip-rings and coacting brushes intermediate the potentiometer and the support member.

5. A device according to claim 1 having means for producing an oscillatory angular movement between the rotor and the potentiometer tapping points.

6. An angular direction sensing device having rotatably mounted on a support member a circular motion potentiometer having electrical power supply connections and input and output connections thereto and a plurality of tapping points, a magnet rotatably mounted so that it can align itself substantially freely with the earth's magnetic field, a rotor driven by rotation of the magnet and operable to connect said tapping points in accordance with its angular position to an output electrical connection, whereby the angular position of the rotor in relation to a given tapping point of the potentiometer, and hence any electrical output signal thereof, is proportional to the angle between said given tapping point and the magnet independent of the orientation of said support member, the angular range of said device being arranged to be greater than 360° by the provision in said circular motion potentiometer of an element having dual supply positions, a two-state device operative to apply a voltage to either one of said supply positions, a trigger device operative to actuate the two-state device to change the voltage from one of said supply positions to the other at a predetermined relative angular position of the rotor and the given tapping point, and means for simultaneously bridging the position to which the voltage is not applied.

7. A device according to claim 6 having electrical low-pass filtering means through which any output signal from the potentiometer is fed, whereby any fluctuations in said output signal are substantially removed.

8. A device according to claim 6 having means for producing an oscillatory angular movement between the rotor and the potentiometer tapping points.

* * * * *